United States Patent
Cahill et al.

(10) Patent No.: US 12,365,635 B2
(45) Date of Patent: Jul. 22, 2025

(54) SHAPE-STABLE STRUCTURES WITH ABLATIVE COOLING

(71) Applicant: LAWRENCE LIVERMORE NATIONAL SECURITY, LLC, Livermore, CA (US)

(72) Inventors: James Timothy Cahill, Livermore, CA (US); Qi Rong Yang, Pleasanton, CA (US)

(73) Assignee: LAWRENCE LIVERMORE NATIONAL SECURITY, LLC, Livermore, CA (US)

( * ) Notice: Subject to any disclaimer, the term of this patent is extended or adjusted under 35 U.S.C. 154(b) by 154 days.

(21) Appl. No.: 17/878,808

(22) Filed: Aug. 1, 2022

(65) Prior Publication Data

US 2024/0034687 A1    Feb. 1, 2024

(51) Int. Cl.
| | | |
|---|---|---|
| *C04B 35/48* | (2006.01) | |
| *B33Y 80/00* | (2015.01) | |
| *C04B 38/00* | (2006.01) | |

(52) U.S. Cl.
CPC .......... *C04B 38/0093* (2013.01); *C04B 35/48* (2013.01); *B33Y 80/00* (2014.12); *C04B 2235/3246* (2013.01); *C04B 2235/3251* (2013.01)

(58) Field of Classification Search
None
See application file for complete search history.

(56) References Cited

U.S. PATENT DOCUMENTS

| | | | |
|---|---|---|---|
| 3,138,009 A | | 6/1964 | McCreight |
| 3,210,233 A | | 10/1965 | Kummer et al. |
| 3,796,616 A | | 3/1974 | Northway |
| 4,031,059 A | | 6/1977 | Strauss |
| 4,100,322 A | | 7/1978 | Seibold et al. |
| 5,359,850 A | | 11/1994 | Prescott |
| 5,536,562 A | * | 7/1996 | Tran ............... C04B 35/524 |
| | | | 428/307.3 |
| 5,672,389 A | | 9/1997 | Tran et al. |
| 6,207,230 B1 | | 3/2001 | Ohya et al. |
| 6,558,785 B1 | | 5/2003 | Rawal et al. |
| 6,955,853 B1 | | 10/2005 | Tran et al. |
| 2020/0369576 A1 | * | 11/2020 | Suzuki ............... C04B 35/581 |

OTHER PUBLICATIONS

Tran et al., Thermal Response and Ablation Characteristics of Lightweight Ceramic Ablators, Journal of Spacecraft and Rockets, vol. 31, No. 6, Nov.-Dec. 1994, pp. 993-998 (Year: 1994).*
Srikanth et al., Mechanical, thermal and ablative properties of zirconia, CNT modified carbon/phenolic composites, Composites Science and Technology, vol. 80, 2013, pp. 1-7 (Year: 2013).*

(Continued)

*Primary Examiner* — Elizabeth Collister
(74) *Attorney, Agent, or Firm* — Zilka-Kotab, P.C.

(57) ABSTRACT

A shape-stable structure that is configured to provide ablative cooling. The structure is used to form a component that includes shape-stable bulk structure and an ablative material. The bulk structure is infiltrated with the ablative material so that the ablative material is disposed in pathways defined by the bulk structure.

19 Claims, 9 Drawing Sheets

(56) References Cited

OTHER PUBLICATIONS

H K M Al-Jothery et al., A review of ultra-high temperature materials for thermal protection system, 2020 IOP Conf. Ser.: Mater. Sci. Eng. 863, pp. 1-8 (Year: 2020).*
Daniel J. Rasky, PhD, "A Perspective on the Design and Development of the SpaceX Dragon Spacecraft Heatshield," Feb. 2012, pp. 1-51.
Driver et al., "Improved Predictions of PICA Recession in Arc Jet Shear Tests," 49th AIAA Aerospace Sciences Meeting, Jan. 2011, pp. 1-16.
Elwan et al., "Preparation and Ablation Performance of Lightweight Phenolic Composite Material under Oxyacetylene Torch Environment," J. Aerospace Technol. Manag., vol. 10, 2018, pp. 1-19.

* cited by examiner

SHAPE-STABLE STRUCTURES WITH ABLATIVE COOLING

This invention was made with Government support under Contract No. DE-AC52-07NA27344 awarded by the United States Department of Energy. The Government has certain rights in the invention.

FIELD OF THE INVENTION

The present invention relates to ablative cooling and more particularly to shape-stable structures configured for ablative cooling.

BACKGROUND

Oftentimes, components exposed to a fluid flow are subjected to undesirable heating. For example, aircraft are subjected to aerodynamic heating during atmospheric flight. If the heating exceeds the natural radiative and conductive cooling of the component, melting and/or ablation of an outer material of the component can occur.

In some approaches, exotic materials or superalloys have been used by themselves to construct the components so that the components are able to withstand the heating. For example, turbine blades are often constructed from exotic materials that can withstand aerodynamic heating. Those structures are often limited to the heat transfer mechanisms for cooling, such as conduction to cooler portions of the structure followed by convection and radiation which requires sufficient size and mass to effectively provide those cooling mechanisms. Additionally, those exotic materials are often expensive and can be difficult, or even dangerous, to manufacture.

Cooling mechanisms have been incorporated into components to provide cooling that allow the components to maintain structural integrity during heating and to survive the harsh environmental conditions. Those cooling mechanisms have generally been constructed as either passive or active systems. Examples of passive cooling systems include heat pipe and ablation surfaces. A heat pipe is a closed system that contains a working fluid. The working fluid is alternatively heated and cooled between a hot region and a cooler region and driven by vaporization, condensation, and wicking. The effectiveness of heat pipes is generally limited to narrow operating temperature ranges and heat pipes often require significant thermal gradient for proper operation. Furthermore, it can be difficult to incorporate a heat pipe structure into narrow or complex geometries.

Ablation surfaces can also be used as passive cooling systems. In particular, an ablation surface provides a material that is shed when the surface is heated. Oftentimes, the ablation surface is reinforced using carbon structures. The shed material carries thermal energy away as the surface erodes. During erosion the carbon reinforcement structure also generally erodes by oxidative erosion. For example, high-speed atmospheric flight results in aerothermal heating of vehicle leading edges and vehicle versatility is limited by the system's ability to withstand extreme temperatures and oxidative corrosion, especially in high-speed, low-atmospheric flight. The shape change presented by ablation surfaces can be problematic when the shape change results in performance degradation.

Carbon fiber reinforced carbon has been used for components, such as nose tips and control surfaces for high-speed aircraft, but that construction suffers from major disadvantages. One major disadvantage is the material's tendency to experience oxidative erosion. For example, current ablative systems, such as the NASA PICA and SIRCA heat shielding, are vulnerable to oxidation, and therefore erosion, making them unsuitable for sharp leading edges where shape integrity is required. Another disadvantage is that the materials have poor manufacturability. Accordingly, ablation surfaces are generally limited to applications in which intense heat flux is applied over short durations and on components where a significant change in shape is acceptable, such as on blunt re-entry vehicles that can operate even after significant change in shape of the ablation surface.

Active cooling systems have also been used to provide cooling. For example, active systems have generally utilized inert gases or water as a working fluid that is actively driven through the system, such as by a compressor or pump. Accordingly, the active systems have required significant operation energy input while requiring large volumes of coolant, and while including components that often require service.

An improved construction is needed for components subjected to aerothermal heating that provides shape stability.

SUMMARY

A component construction is described that utilizes ablative cooling while providing shape stability when the component is exposed to aerothermal heating. The component construction can be used in portions of aircraft that require shape stability to maintain performance while being subjected to aerothermal heating. The construction, and a component made with the construction, includes a shape-stable bulk structure and an ablative material.

A product, according to some embodiments, includes a bulk structure and an ablative material. The bulk structure defines an outer surface and a plurality of pathways that intersect the outer surface. The bulk structure is constructed from at least one high temperature material that is shape-stable in a fluid flow and at an operating temperature of at least 2000° C. The ablative material is disposed within the pathways and is configured to transition between a solid phase and a vapor phase over an operating temperature range.

A product, according to some embodiments, includes a bulk structure and an ablative material. The bulk structure defines an outer surface and a plurality of pathways that intersect the outer surface. The bulk structure is constructed from at least one high temperature oxide that includes a base element that is a transition metal or a rare earth element. The ablative material is disposed within the pathways and is configured to transition between a solid phase and a vapor phase over an operating temperature range.

A method of making a product, according to some embodiments, includes forming a bulk structure defining an outer surface and a plurality of pathways, infiltrating the bulk structure with an ablative material so that the ablative material is disposed within the pathways, and curing the ablative material disposed in the pathways of the bulk structure. The pathways intersect the outer surface, and the bulk structure is constructed from at least one high temperature material that is shape-stable in a fluid flow and at an operating temperature of at least 2000° C.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

I. Introduction

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. The term "about" as used herein indicates the value preceded by the term "about," along with any values reasonably close to the value preceded by the term "about," as would be understood by one of skill in the art. When not indicated otherwise, the term "about" denotes the value preceded by the term "about" ±10% of the value. For example, "about 10" indicates all values from and including 9.0 to 11.0.

II. Example Embodiments

The following description discloses several preferred structures that include shape-stable structures with ablative cooling. The structure generally includes a shape-stable bulk structure that defines a plurality of pathways so that the bulk structure can be infiltrated with ablative material. As a result, the structure can take advantage of multiple heat transfer mechanisms to provide cooling.

Figure 1A:
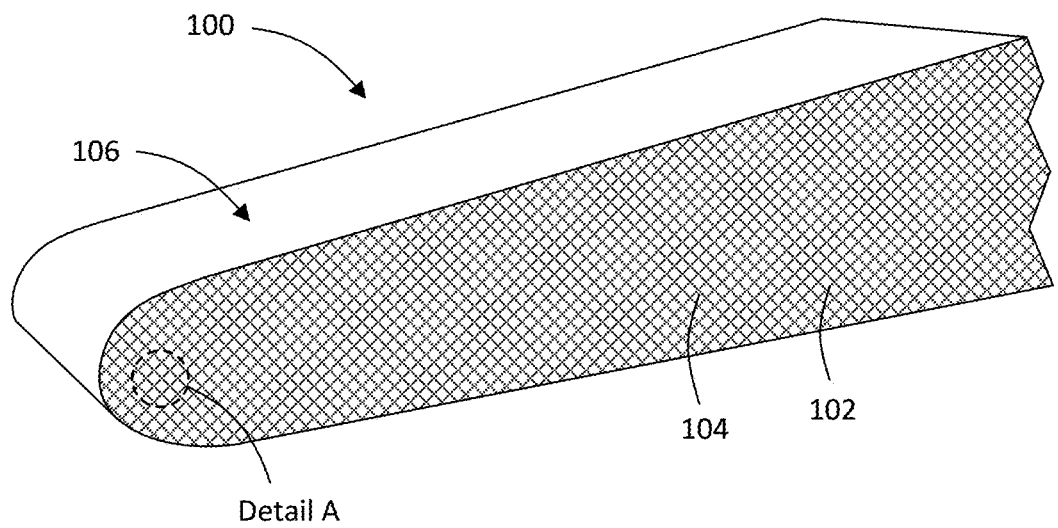
FIG. 1A is a perspective view of a shape-stable structure configured to provide ablative cooling in accordance with an embodiment.
Figure 2A:
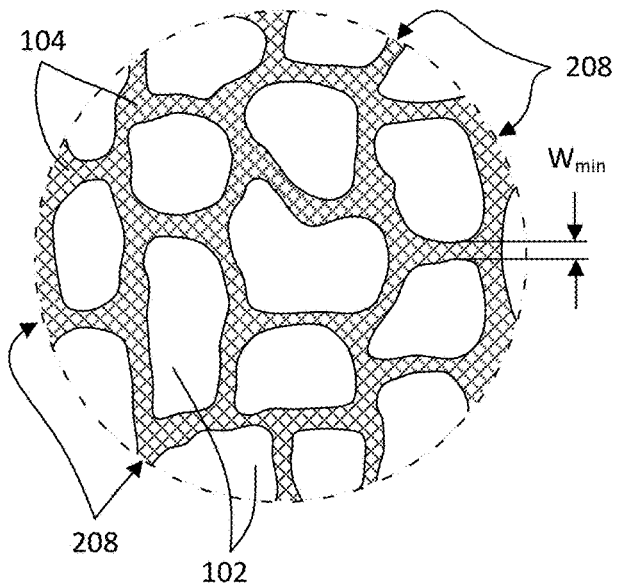
FIG. 2A is a cross-sectional view of a portion, corresponding to Detail A, of the structure of FIG. 1A.
Figure 2B:
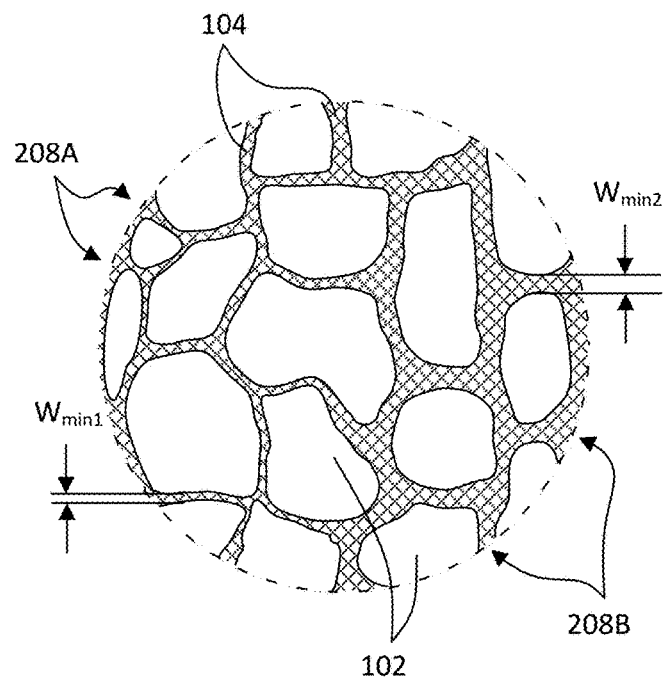
FIG. 2B is an alternative cross-sectional view of a portion, corresponding to Detail A, of the structure of FIG. 1A.

Referring to FIGS. 1A, 2A and 2B, an exemplary component 100, such as a leading edge of an airfoil, is configured to offer shape stability while providing cooling by a plurality of heat transfer mechanisms including ablation. Component 100 is generally constructed from a bulk structure 102 and a sacrificial ablative material 104. Bulk structure 102 is shape-stable so that it defines a stable profile of an outer surface 106 and a stable volumetric envelope of component 100. The material of bulk structure 102 is selected so that bulk structure 102 defines an overall shape and size of component 100 that does not change significantly between a first state prior to use and a second state after use. The first state and the second state generally correspond to unablated and ablated conditions. Bulk structure 102 is also configured so that it can be infiltrated with ablative material 104 and so that it provides pathways 208 to outer surface 106 for the decomposition products of ablative material 104 to be exhausted after undergoing a phase change in response to heating. Bulk structure 102 forms a shape-stable lattice that maintains the original outer surface contour during use as the ablative material recedes.

Pathways 208 are configured to retain ablative material 104 until heating causes ablative material 104 to be exhausted during use. In particular, pathways 208 are sized and shaped so that the bulk structure 102 can be infiltrated with the ablative material 104 which is retained until it is pyrolyzed and exhausted from the bulk structure 102 during use. The pathways 208 can be configured as pores extending through all, or portions, of the shape-stable structure 102. Pathways 208 can have a random configuration, predefined configuration, or a combination of random and predefined configurations. Pathways 208 are also configured to provide a continuous route for ablative material 104 after infiltration to outer surface 106 of the component 100. In at least some embodiments, the bulk structure 102 is constructed to provide pathways 208 via porosity so that it forms a porous bulk phase. The density of the bulk structure material is altered by the configuration of pathways 208. The density is generally in a range so that the bulk structure provides sufficient structure to maintain its shape during use with or without the presence of the ablative material 104. In some embodiments, the density is in a range of 20% to less than 100%. In some embodiments the density is in a range of 20-80%. In some embodiments, the pathways 208 can be constructed in a predefined configuration such as a network of predefined channels.

The configuration of pathways 208 at an outer edge of bulk structure 102 is selected so that the outer surface 106 of component 100 is primarily formed by the material of bulk structure 102. Additionally, the material of bulk structure 102 is selected from materials that are shape-stable within a predetermined operating temperature range. As a result, the shape of the outer surface 106 remains substantially constant with or without the presence of ablative material 104. In at least some embodiments, the shape-stable structure 102 is configured so that greater than 50% of the surface area of outer surface 106 is defined by the material of bulk structure 102. In some embodiments, greater than 60% of the surface area of outer surface 106 is formed by the material of bulk structure 102. In some embodiments, greater than 70% of the surface area of outer surface 106 is formed by the material of bulk structure 102.

The material of the bulk structure 102 is generally selected from a material that does not breakdown or oxidize when exposed to aerothermal heating environments. In particular, the material is selected so that it provides structural integrity and shape stability without substantial melting, sublimating, phase separation or transformation, etc. (as applicable for a particular material), at temperatures below a predefined operating temperature limit. For example, the material of bulk structure 102 can be selected from ceramic materials such as high-temperature oxide materials. One advantage of selecting one or more high-temperature oxide materials for the material of bulk structure 102 is that because the material is an oxide, there is reduced susceptibility of bulk structure 102 to experience oxidative erosion. In some embodiments, the material includes a blend of high-temperature oxide materials. In some embodiments, bulk structure 102 is constructed from at least one high temperature oxide that includes a base element that is a rare earth element. In some embodiments, bulk structure 102 is constructed from at least one high temperature oxide that includes a base element that is a transition metal. In some embodiments, bulk structure 102 is constructed from $HfO_2$, $ZrO_2$, $Ta_2O_5$, $Eu_2O_3$, $Yb_2O_3$, $Dy_2O_3$, $Ho_2O_3$, $Er_2O_3$, $Y_2O_3$, or combinations thereof. In some embodiments, bulk structure 102 is constructed from combinations of the high-temperature oxide materials such as $HfO_2$—$Ta_2O_5$, $HfO_2$—$Lu_2O_3$, or $ZrO_2$—$Y_2O_3$. In embodiments including combinations of high-temperature materials, the materials can be mixed to form a single stable phase with a breakdown temperature (e.g., a melting temperature, a sublimation temperature, a phase separation temperature, a phase transformation temperature, a decomposition temperature, etc. as applicable to a particular material) that is greater than 2000° C. In some embodiments, the material used to construct the bulk structure has a breakdown temperature greater than 2,200° C. In some embodiments, the material used to construct the bulk structure has a breakdown temperature greater than 2,400° C. In some embodiments, the material used to construct the bulk structure has a breakdown temperature between 2,200° C. and 2,900° C. The materials generally reduce manufacturing cost and complexity by being relatively low cost and capable of being processed under moderation conditions, i.e., less than 1700° C. in air.

The manufacturing method of bulk structure 102 can be selected based on the desired configuration of the pathways 208 and the desired material. Bulk structure 102 can be constructed using for example gel-casting, casting, extrusion, photolithography, additive manufacturing (such as direct ink writing, binder jet printing, acoustic powder jetting, laser sintering), etc. and the construction method can also include subsequent sintering and heat treatment. For example, the configuration of the pathways 208 can be repeated or varied throughout the structure. The configuration of pathways 208 can be used to control the distribution of ablative material 104 relative to the bulk material throughout component 100. As shown in FIG. 2A the routing of pathways 208 can be generally random throughout the bulk structure 102 while the width of pathways 208, i.e., a minimum width of the pathways 208 ($W_{min}$), remains constant. The minimum width of the pathways ($W_{min}$) may range in size from 100's of nanometers to millimeters. For example, in some embodiments, the minimum width of the pathways ($W_{min}$) is in a range of 100 nm to 10 mm.

In an alternative embodiment, shown in FIG. 2B, the bulk structure 102 defines pathways 208A and 208B having different sizes. For example, a first portion of bulk structure 102 includes pathways 208A having a first minimum width ($W_{min1}$), and a second portion of bulk structure 102 includes pathways 208B having a second minimum width ($W_{min2}$) that is different than the first minimum width $W_{min1}$. The minimum width of the pathways extending throughout bulk structure 102 can vary so that a first portion of bulk structure 102 has more narrow pathways than a second portion of bulk structure 102. In some embodiments, the sizes of the pathways can vary as a gradient with the sizes changing progressively through a portion of bulk structure 102. In some embodiments, the sizes of the pathways can vary stepwise with the size of the pathways having a first size in a first portion and a second size in a second portion, where the first and second sizes are different. In some embodiments, bulk structure 102 can be configured so that more narrow pathways 208 are disposed adjacent outer surface 106 of the bulk structure 102 to alter the surface characteristics of outer surface 106, e.g., to alter the porosity of outer surface 106.

Figure 2C:
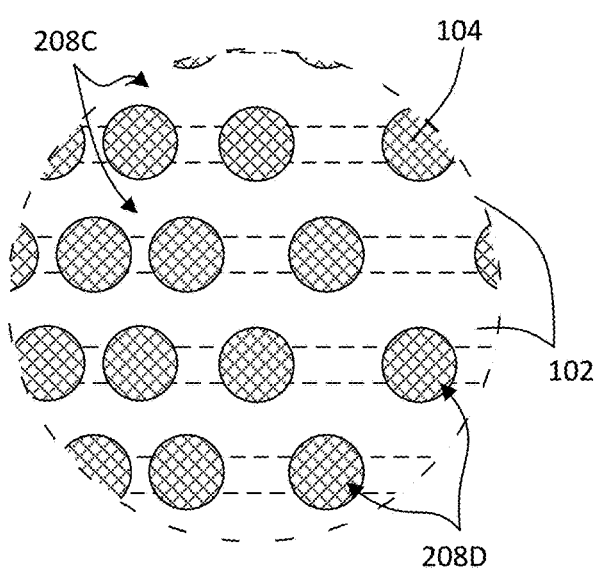
FIG. 2C is a further alternative cross-sectional view of a portion, corresponding to Detail A, of the structure of FIG. 1A.

In an alternative embodiment, shown in FIG. 2C, bulk structure 102 defines generally orthogonal, elongate pathways 208C and 208D. For example, a first portion of bulk structure 102 includes pathways 208C that extend generally parallel to the plane of the cross-sectional image (shown by dashed lines), and a second portion of bulk structure 102 includes pathways 208D that extend orthogonal to pathways 208C. The spacing of one, or both, of pathways 208C and 208D can be varied to alter the density of bulk structure 102 which defines the distribution of ablative material 104 within the component. Additionally, the angular orientation of the pathways can vary throughout bulk structure 102. The pathways can be constructed by forming an architecturally designed pathway structure from a sacrificial material and co-casting that sacrificial structure with the material of bulk structure 102. In an example, the sacrificial structure and the material of the bulk structure 102 are co-cast into a green body and the sacrificial structure is removed during subsequent processing such as heat treatment or sintering. It should be appreciated that the spacing, angular orientation, and/or size of pathways 208C and 208D can be varied throughout bulk structure 102.

Ablative material 104 is selected to be a sacrificial ablative material. In some embodiments, ablative material 104 is a sacrificial polymeric ablative phase. In some embodiments, ablative material 104 is a polymeric material that decomposes upon heating, such as phenolic resin ($C_6H_6O$). For example, upon heating the polymeric material can decompose according to $C_6H_6O$ à $4C+C_2H_6O(g)$, where 4C remains behind as a solid, i.e., char, while $C_2H_6O$ further decomposes into smaller gas molecules that dissipate out through pathways 208. The ablative material can also be selected from low melting point metals or glasses.

During manufacture, the shape-stable bulk structure 102 is infiltrated with ablative material 104. Ablative material 104 at least partially fills the pathways 208 that are formed in bulk structure 102 to create the composite structure of component 100, as shown in FIGS. 2A and 2B. The infiltration of ablative material 104 can be accomplished using a variety of techniques. In an example, the bulk structure 102 can be vacuum infiltrated with the ablative material 104 in a liquid state. In another example, the pathways 208 are sized so that the ablative material 104 in a liquid state can be drawn or wicked into the pathways 208 using capillary action. In further examples, the ablative material 104 can be pressurized and forced into pathways 208. In still further examples, bulk structure 102 can be soaked in a container of ablative material 104 to infiltrate the bulk structure. It should be appreciated that the bulk structure can be infiltrated with the ablative material in stages using any combination of vacuum infiltration, wicking, pressurized infiltration, and soaking.

Figure 1B:
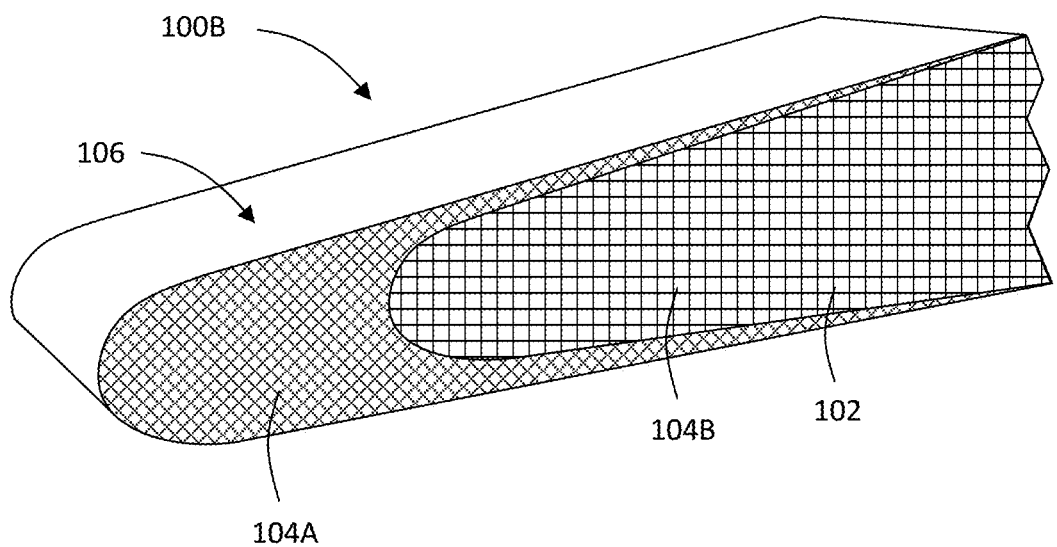
FIG. 1B is a perspective view of a shape-stable structure configured to provide ablative cooling in accordance with an embodiment.

The bulk structure can also be infiltrated with more than one type of ablative material, as illustrated in FIG. 1B. In particular, the types and locations of the ablation materials can be selected based on the expected variation in thermal environment during flight. As an example, flight at higher altitude and/or at slower speeds may be cooler than portions of the flight at lower altitude and/or higher speeds and different ablation materials can be selected and disposed within the bulk structure to optimize cooling for those portions of flight. In an example, a plurality of ablative materials can be layered to be exposed during selected portions of the flight trajectory. The bulk structure can be infiltrated with the different ablative materials in stages using the same or different infiltration processes, such as the processes described above.

In the illustrated example, a component 100B, such as a leading edge of an airfoil, is configured to offer shape stability while providing cooling by a plurality of heat transfer mechanisms including ablation. Component 100B is generally constructed from a bulk structure 102, which can have an identical structure as the prior embodiments, and a plurality of sacrificial ablative materials 104A and 104B. Bulk structure 102 is shape-stable so that it defines a stable profile of an outer surface 106 and a stable volumetric envelope of component 100B. The material of bulk structure 102 is selected so that bulk structure 102 defines an overall shape and size of component 100B that does not change significantly between the first, unablated, state prior to use and the second, ablated, state after use. The first state and the second state generally correspond to unablated and ablated conditions. Bulk structure 102 is also configured so that it can be infiltrated with ablative materials 104A and 104B and so that it provides pathways to outer surface 106 for the decomposition products of ablative materials 104A and 104B to be exhausted after undergoing a phase change in response to heating. Bulk structure 102 forms a shape-stable lattice that maintains the original outer surface contour during use as the ablative material recedes.

The configuration of the ablative materials can be varied to provide specific ablation behavior, such as during different stages of the trajectory of component 100B. In the exemplary embodiment, the first ablative material 104A is disposed closest to outer surface 106 and the second ablative material 104B is spaced from outer surface 106. As a result, when component 100B is subjected to heating, the first ablative material 104A will pyrolyze and be exhausted prior to the second ablative material 104B pyrolyzing. Additionally, the thicknesses of the ablative materials can vary, for example based on heating profile of component 100B during use, such as determined by simulation. For example, the thickness of the first ablative material 104B can be thickest adjacent a leading edge of component 100B.

Figure 3:
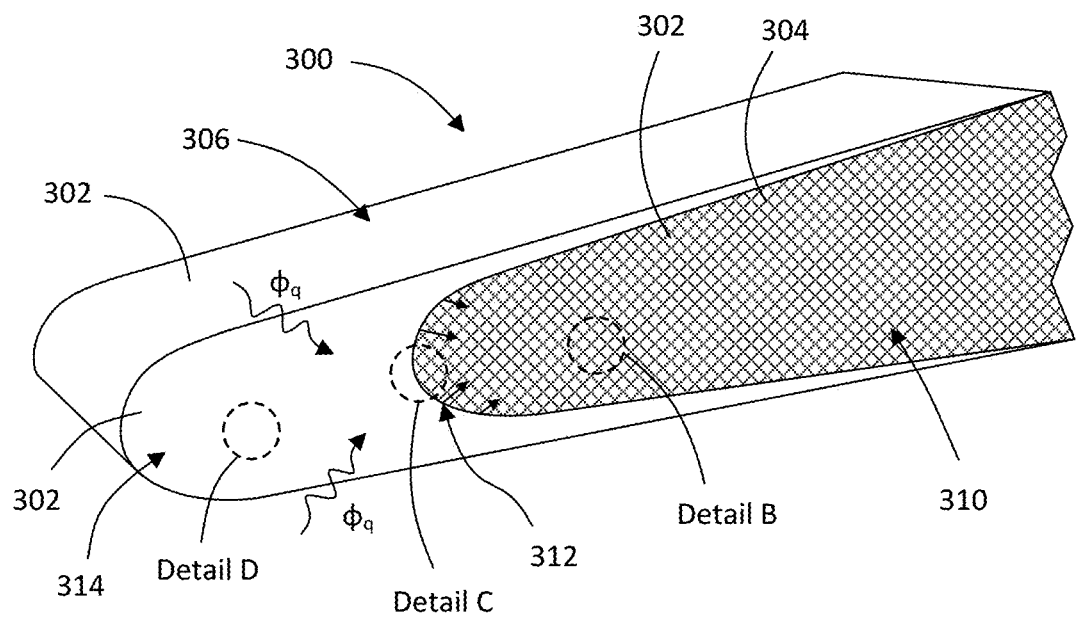
FIG. 3 is another perspective view of the shape-stable structure configured to provide ablative cooling of FIG. 1A in use.

Referring now to FIG. 3, in an example embodiment a component 300 forms at least a portion of a leading edge of an airfoil that is exposed to a free stream of fluid. Similar to previous embodiments, component 300 is generally constructed from a bulk structure 302 infiltrated with a sacrificial ablative material 304. As shown in FIG. 3, during use component 300 can be exposed to aerothermal heating causing an ablation material 304 to pyrolyze and provide ablative cooling. As a result, after some period of use, component 300 includes an unablated portion 310, a transition portion 312, and an ablated portion 314. Bulk structure 302 is shape-stable so that it defines a stable outer surface profile of an outer surface 306 and volumetric envelope of the component 300 even after ablation.

Figure 4:
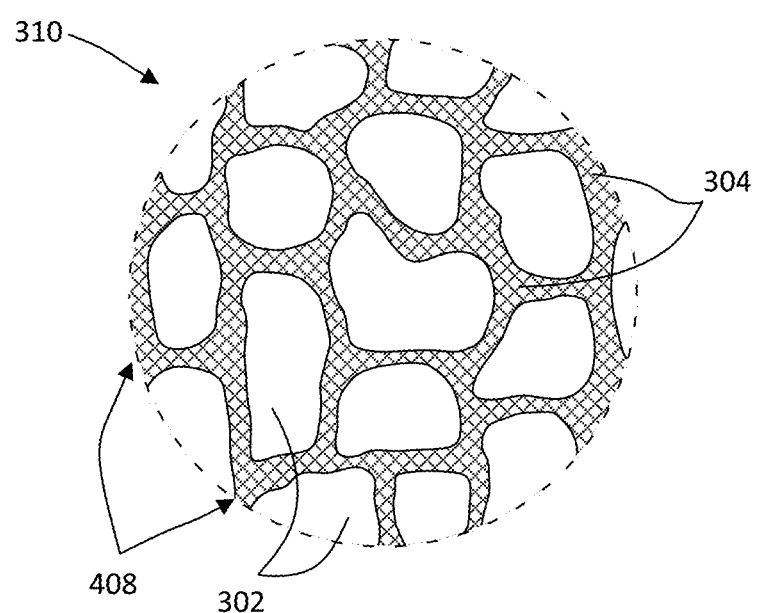
FIG. 4 is a cross-sectional view of a portion, corresponding to Detail B, of the structure of FIG. 3.

The unablated portion 310 is a portion of component 300 that is in an unablated condition. The unablated portion 310 includes bulk structure 302 and virgin ablative material 304 disposed within pathways 408, as shown in FIGS. 3 and 4. In particular, the unablated portion 310 of component 300 has not been heated above a temperature at which the ablative material 304 pyrolyzes, so that it has not undergone decomposition due to heating. Referring back to FIG. 1, the entire structure of component 100 is shown in an unablated condition and the entire bulk structure 102 is infiltrated with virgin ablative material 104.

Figure 5:
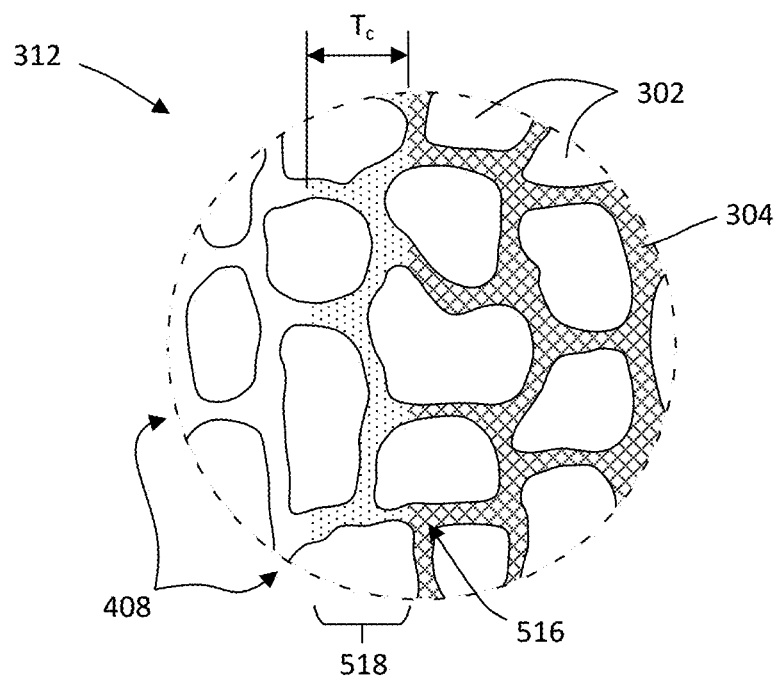
FIG. 5 is a cross-sectional view of a portion, corresponding to Detail C, of the structure of FIG. 3.

The transition portion 312, shown in FIGS. 3 and 5, is a portion of the component 300 that transitions from the unablated condition of unablated portion 310 to the ablated condition of ablated portion 314. As shown in FIG. 5, transition portion 312 is a portion of the component 300 that includes the portion of the ablation material 304 actively pyrolyzing. The boundary of active pyrolysis creates an ablation front 516. During use, ablation front 516 can recede away from outer surface 306 of component 300 as ablation material 304 is consumed by decomposition.

Adjacent ablation front 516, residual char is formed as a byproduct of the pyrolysis and at least temporarily forms a char layer 518. Char layer 518 has a thickness $T_c$ corresponding to the amount of char built up adjacent the nearest virgin ablative material 304. The char material can also oxidize and be exhausted from the bulk structure 302 which can result in char layer 518 receding away from outer surface 306 with ablation front 516.

In particular, ablative material 304 pyrolyzes and decomposes into the char material and $C_2H_6O$ gas. The $C_2H_6O$ gas can further decompose into smaller gas molecules that dissipate out of bulk structure 302 through pathways 408. Initially, the char material remains as a residual solid forming char layer 518. However, with further heating, the char material can be subsequently oxidized and carried away by CO gas out of bulk structure 302. The exhaustion of the gas molecules and oxidized char material removes heat from component 300 to provide an ablative cooling effect. The recession of the ablation front 516 from outer surface 306 can provide an additional advantage when providing the ablative cooling effect. In particular, the oxidation of char material is exothermic when the oxygen is monatomic (O) and endothermic when the oxygen is diatomic ($O_2$). Monatomic oxygen may exist in the hottest portion of a fluid flow in some flow regimes, which is generally closest to the outer surface. In known systems, the char material does not recede and is exposed to monatomic oxygen. In accordance with the embodiments described herein, the char layer recedes into the bulk structure and provides an opportunity for the ablation front to be insulated from the hottest portion of the free stream at the outer surface, which provides an opportunity for the oxygen in the pathways to recombine into diatomic oxygen where it can react endothermically with the receding char layer.

The duration of the ablative cooling effect is dependent on the heat flux $\phi_q$ and pressure experienced by a leading edge of the component 300. The heat flux and pressure are dependent on the flight speed and trajectory. Assuming a heat flux of 450 W/cm$^2$ and stagnation point pressure of 0.5 atm, the steady-state mass removal rate from $C_6H_6O$ decomposition and char oxidation is approximately 0.007 g/cm$^2$s. However, this is only for recessive ablation and continuous free stream exposure of char layer 518. In the construction of the various embodiments described herein, the ablation front recedes into the porous ceramic structure of the bulk structure. That recession results in ablation front 516 becoming more insulated from the free stream as it progresses deeper into bulk structure 302. As a result, the heat flux $\phi_q$ that the char and virgin ablative material 304 are exposed to progressively reduces, thereby slowing the mass removal rate and extending operation time.

Figure 6:
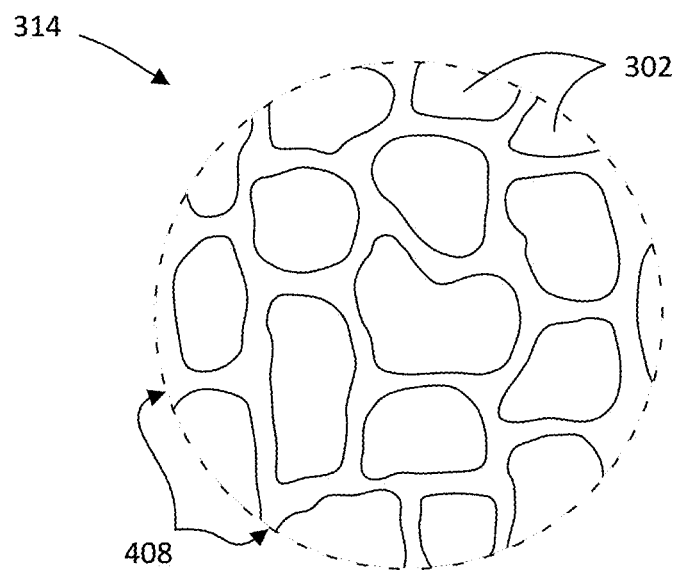
FIG. 6 is a cross-sectional view of a portion, corresponding to Detail D, of the structure of FIG. 3.

The ablated portion 314, shown in FIGS. 3 and 6, is generally formed by the remaining bulk structure 302 after ablation material 304 is consumed, i.e., pyrolyzed and exhausted. In particular, the volumetric envelope and shape of ablated portion 314 is approximately the same as it was in an unablated condition, but the pathways 408 are vacant. Even though ability to ablatively cool the ablated portion is exhausted after ablation material 304 is pyrolyzed and exhausted, the ablated portion 314 can provide cooling nevertheless through conduction, convection, and radiation by the remaining structure of bulk structure 302. Additionally, the shape stability of bulk structure 302 maintains the size and shape of component 300, which makes it possible for the ablation front 516 and char layer 518 to recede from the outer surface 306, unlike known structures that have a reinforcement material that erodes with the ablative material. As a result, the ablated portion 314 provides improved insulation from the free stream and outer surface 306 which is directly subjected to aerothermal heating.

Figure 7:
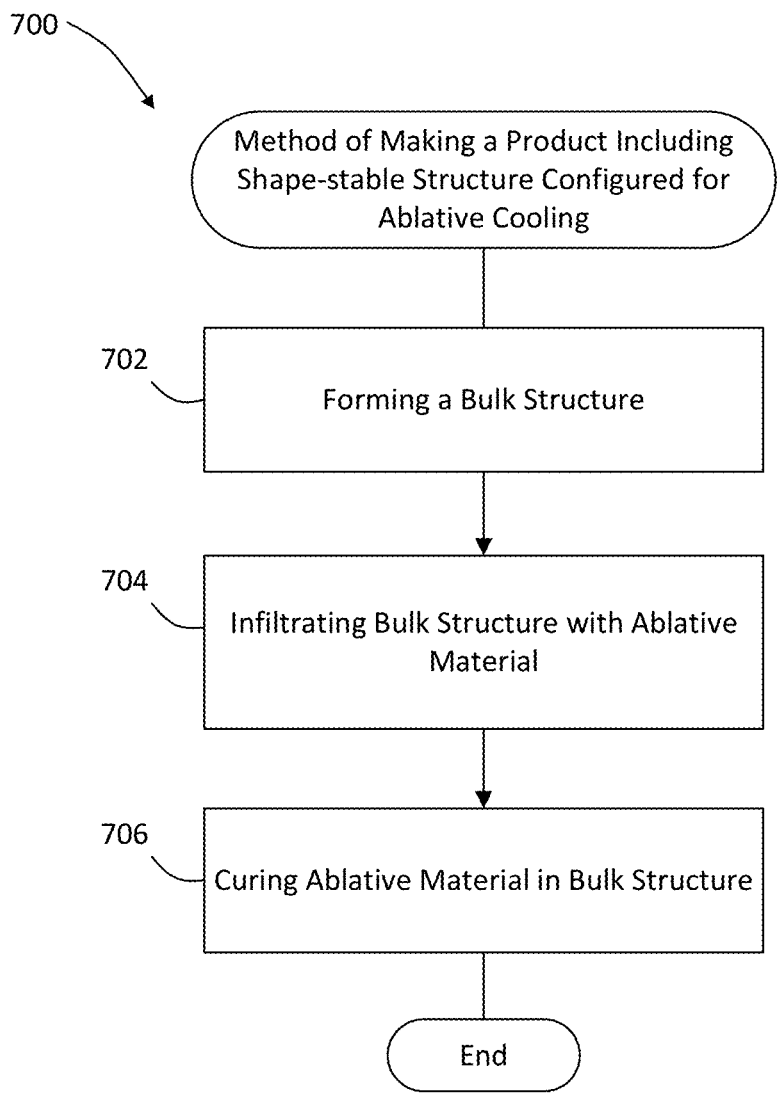
FIG. 7 is a flowchart showing a method of making a shape-stable structure configured to provide ablative cooling in accordance with an embodiment.

FIG. 7 depicts a flowchart 700 of an example method of making a shape-stable ablatively cooled structure in accordance with at least one embodiment. The method of flowchart 700 can be used to construct a component having a shape-stable structure configured for ablative cooling, such as the components described herein with reference to FIGS. 1-6. Further compositional, structural, and operational embodiments will be apparent to persons skilled in the relevant art(s) based on the discussion regarding flowchart 700.

As shown in FIG. 7, the method of flowchart 700 begins at step 702. In step 702, a bulk structure is formed. The bulk structure defines a plurality of pathways formed to be at least partially filled with an ablative material. The bulk structure is shape-stable and defines the outer surface and the volumetric envelope for a component. For example, a bulk structure, such as bulk structure 102 shown in FIGS. 1, 2A, and 2B that includes outer surface 106 and pathways 208 is formed. In some embodiments, the forming step is performed to provide near-net shaping of the bulk structure.

In an example, the bulk structure can be formed using gel-casting. In particular, a polymer is added to the bulk structure material. The combination is poured into a mold and allowed to dry or cure so that the molded part forms a green body that is at least partially solidified. The molded green body can then be sintered resulting in the removal of some, or all, of the polymer. The sintering conditions can be tailored to alter the porosity in the bulk structure thereby altering the pathways provided for the ablative material. For example, by sintering the green body longer and/or hotter will create a greater density, i.e., closer to full density, in the final bulk structure.

In another example, the bulk structure can be formed by casting the material with a porogen to form a green body. The porogen can be provided as an additive that is randomly distributed through the green body (e.g., sugar crystals), or the porogen can be an architecturally designed pathway or pathway structure, such as a lattice, framework, or other continuous structure. A porogen having an architecturally designed configuration can be used to define pathways, such as those shown in FIG. 2C, to provide cooling for a target heat flux in a particular flight path or portion of flight path. The green body can then be fired to cure the cast material and to remove the porogen to create the pathways extending through the bulk structure. In another example, the bulk structure can be constructed by additive manufacturing, such as direct ink writing, and the pathways can be written into the configuration of the bulk structure.

The step of forming the bulk structure can include one or more machining operations. When a gel-casting process is used to form the green body, the amount of polymer used can be tailored to provide a desired machinability of the green body.

The step of forming the bulk structure can also optionally include an earlier mixing operation to create the material prior to formation of the bulk structure. For example, oxide powders of different composition can be mixed at a predetermined percentage, such as weight percentage. After the compositions are mixed, the mixture can be heated to homogenize the mixture and to form a single phase. The homogenized mixture can be ground into a powder or cast directly. Alternatively, the compositions can be selected and mixed to form a composite, such as a particulate composite material.

At step 704, the bulk structure is infiltrated with ablative material. In particular, the pathways formed in the bulk structure are at least partially filled with a liquid phase of the ablative material. In an example, the bulk structure can be placed in a container with liquid polymer ablative material to infiltrate the bulk structure utilizing capillary action and/or soaking. In some embodiments, vacuum assisted infiltration can be used to infiltrate the bulk structure with the ablative material. In some embodiments, the ablative material can be pressurized to infiltrate the bulk structure by driving the ablative material into the bulk structure. As noted above, the bulk structure can be infiltrated with the ablative material using any combination of vacuum infiltration, wicking, pressurized infiltration, and soaking.

At step 706, the ablative material is subsequently cured so that it is hardened into a solid phase within the pathways.

Figure 8:
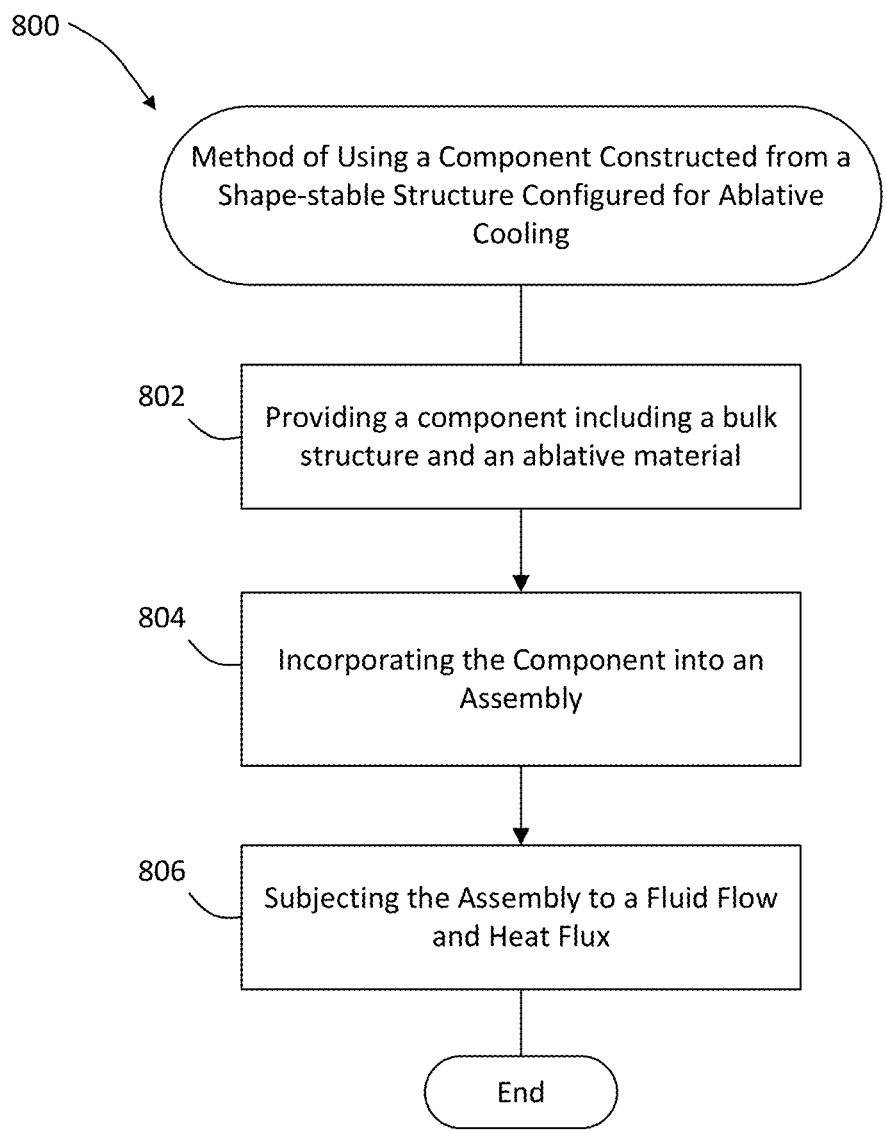
FIG. 8 is a flowchart showing a method of using a shape-stable structure configured to provide ablative cooling in accordance with an embodiment.

FIG. 8 depicts a flowchart 800 of an example method of using a component constructed from a shape-stable structure configured for ablative cooling, in accordance with at least one embodiment. The method of flowchart 800 can be utilized with a component including a shape-stable structure configured for ablative cooling such as the components described herein with reference to FIGS. 1-6. Further compositional, structural, and operational embodiments will be apparent to persons skilled in the relevant art(s) based on the discussion regarding flowchart 800.

As shown in FIG. 8, the method of flowchart 800 begins at step 802. In step 802, a component including a bulk structure and an ablative material is provided. The bulk structure defines a plurality of pathways formed to be at least partially filled with the ablative material. The bulk structure is shape-stable and defines the outer surface and the volumetric envelope for the component. For example, a component including a bulk structure and an ablative material, such as component 100 shown in FIGS. 1, 2A, and 2B is provided.

At step 804, the component is incorporated into an assembly. In particular, the component can form a portion of an assembly, such as a flight structure. For example, the component can form a leading edge of an airfoil.

At step 806, the assembly including the component is subjected to a fluid flow and heat flux.

Figure 9:
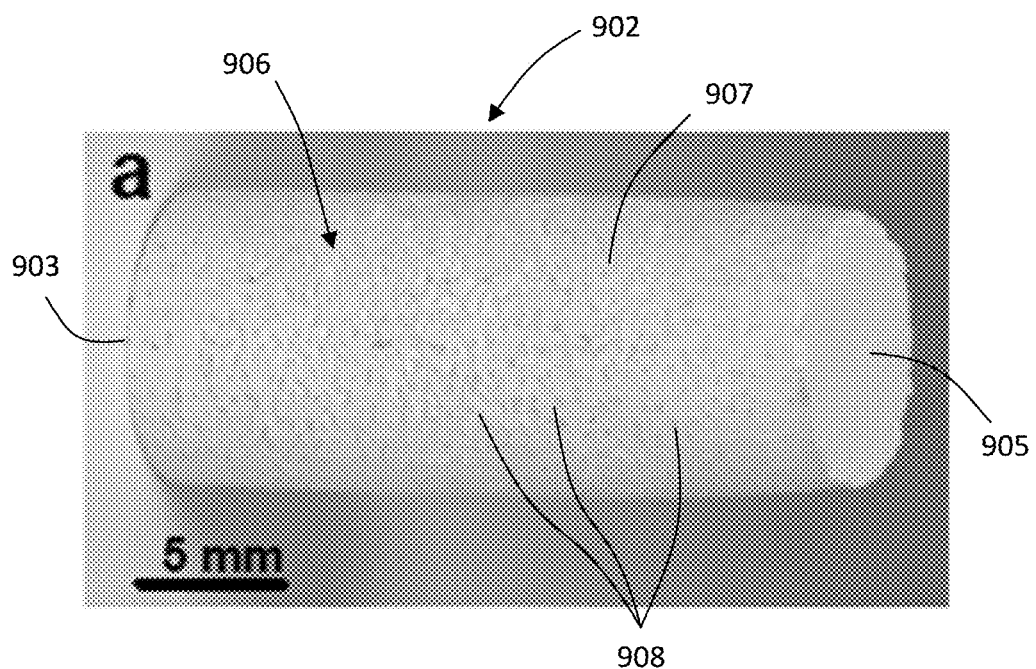
FIG. 9 is an image of an exemplary bulk structure that can be included in a component in accordance with an embodiment.

Experimental test articles, including a non-infiltrated bulk structure and an infiltrated bulk structure, were formed and tested to confirm the shape-stability and behavior of a bulk structure with an ablative material. FIGS. 9-14 illustrate various conditions of the test articles. As shown in FIG. 9, an exemplary bulk structure 902 was formed. In the illustrated embodiment, the bulk structure 902 is generally constructed as a monolithic cylinder defining an outer surface 906 that includes a first end wall 903, a second end wall 905, and a side wall 907 extending between first end wall 903 and second end wall 905. Bulk structure 902 was constructed from a material that includes a combination of high-temperature oxide materials, and in particular a combination of $HfO_2$ and $Ta_2O_5$. The combination of high-temperature materials was mixed to form a single stable phase with a breakdown temperature of about 2,250° C. In this particular example, the material combination provides a peritectic reaction between a liquid $Ta_2O_5$ and a solid $HfO_2$ that decomposes above about 2,250° C.

Bulk structure 902 was also configured so that it defined pathways 908 to the outer surface. Bulk structure 902 was constructed so that it could have been infiltrated with an ablative material with pathways 908 extending through the entire bulk structure. For example, pathways 908 extend through bulk structure 902 and provide fluid communication between the interior of bulk structure 902 and the surrounding environment. As shown in FIG. 9, the pathways form openings on outer surface, and the openings are apparent on side wall 907 of the bulk structure 902.

The bulk structure 902 formed a shape-stable structure configured to maintain the original shape during heating. The shape-stability of bulk structure 902 results in bulk structure 902 defining a stable profile and a stable volumetric envelope before and after heating. The material of bulk structure 902 is selected so that bulk structure defines an overall shape and size of the component that does not change significantly between a first state prior to use and a second state after use, generally corresponding to unablated and ablated conditions.

Figure 10:
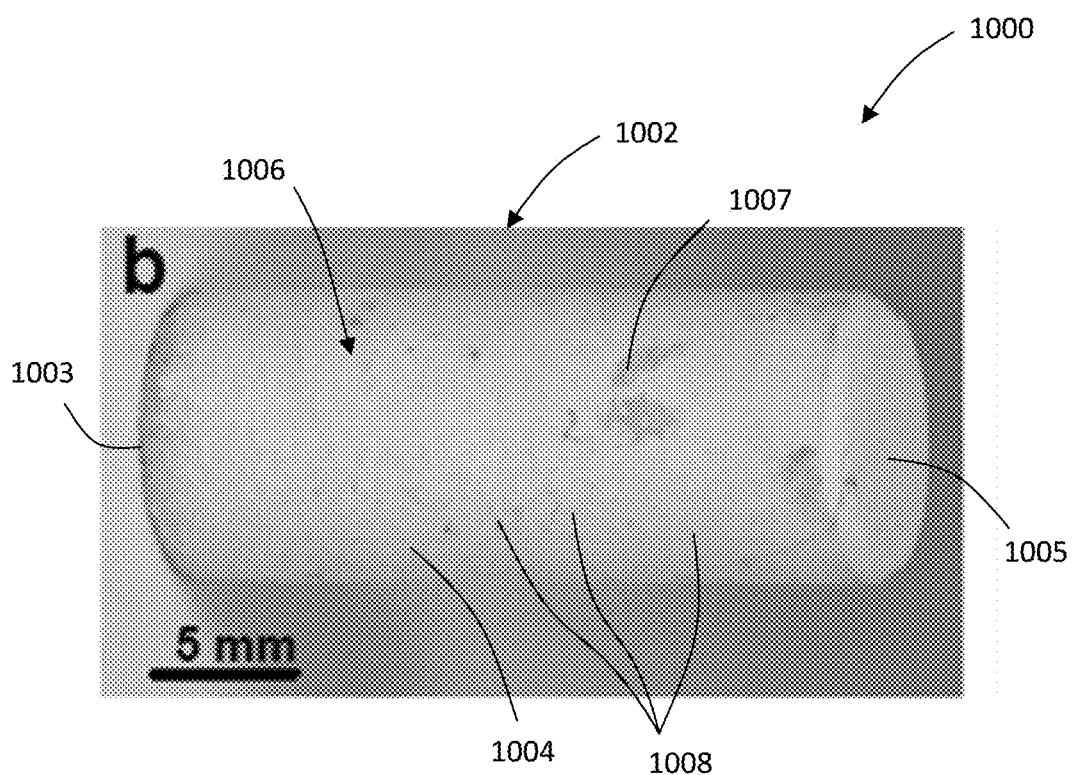
FIG. 10 is an image of an exemplary component having a shape-stable structure configured to provide ablative cooling in accordance with an embodiment.

Referring to FIG. 10, an exemplary component 1000 including a bulk structure 1002 that was infiltrated with an ablative material 1004 is shown. In the illustrated embodiment, the bulk structure 1002 was generally constructed as a cylinder defining an outer surface 1006 that includes a first end wall 1003, a second end wall 1005, and a side wall 1007 extending between the first end wall 1003 and the second end wall 1005. Bulk structure 1002 was constructed from a material that includes a combination of high-temperature oxide materials, similar to bulk structure 902 of FIG. 9, particularly a combination of $HfO_2$ and $Ta_2O_5$.

Bulk structure 1002 defines pathways 1008 that extend through bulk structure 1002 to outer surface 1006. Pathways 1008 were filled with ablative material 1004. Pathways 1008 provide fluid communication between the interior of the bulk structure 1002 and the surrounding environment so that ablative material 1004 has a pathway to the exterior of component 1000. As shown in FIG. 10, openings on outer surface 1006 of bulk structure 1002 are filled with ablative material 1004 providing a generally smooth surface in comparison to bulk structure 902 shown in FIG. 9.

Figure 11:
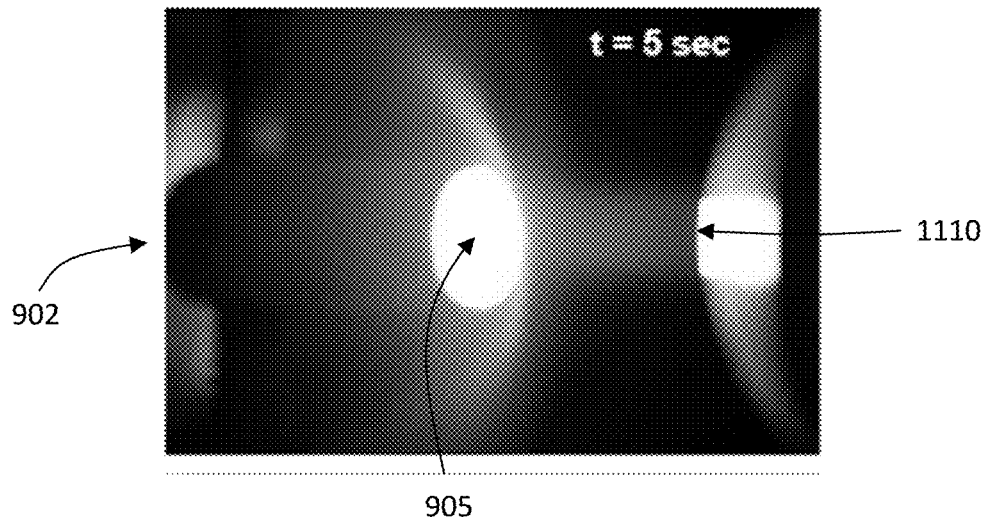
FIG. 11 is an image of the bulk structure of FIG. 9 after 5 seconds of heating during testing.
Figure 12:
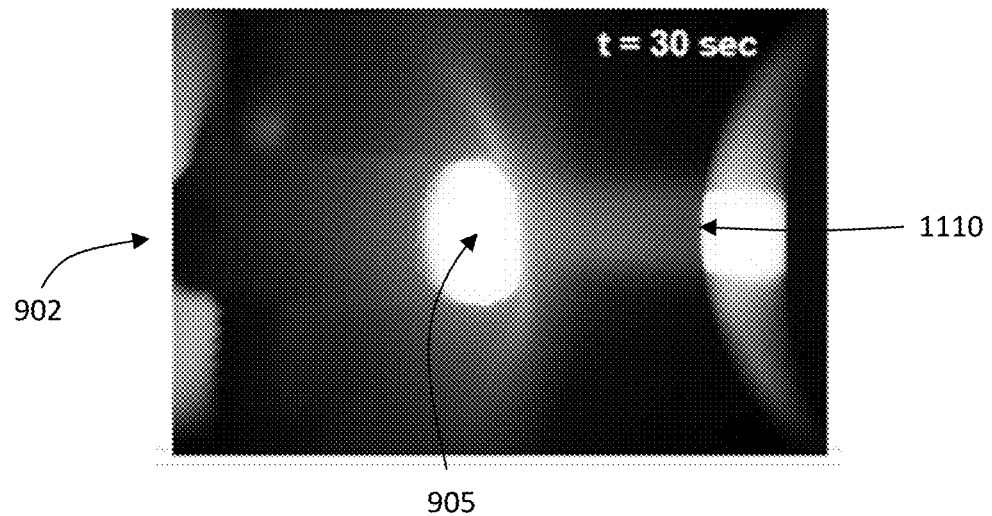
FIG. 12 is an image of the bulk structure of FIG. 9 after 30 seconds of heating during testing.

Referring to FIGS. 11 and 12, the ceramic monolith of bulk structure 902 was subjected to high-temperature testing using an oxygen-propane torch and imaged using a digital camera with neutral density filters to prevent sensor saturation. The hottest point of a pure oxygen and propane flame is approximately 2,800° C. The torch was directed toward the test sample while the temperature of the sample was maintained below the breakdown temperature for that material. The figures illustrate the oxygen-propane torch 1110 directed toward the second end wall 905 of bulk structure 902 after 5 seconds and 30 seconds, respectively. The image of FIG. 11 shows bulk structure 902 after 5 seconds of heating with torch 1110 directed toward second end wall 905. The image of FIG. 12 shows bulk structure 902 after 30 seconds of heating with torch 1110 directed toward second end wall 905. A comparison of the images illustrates that the shape remains substantially unchanged even after 30 seconds of high-temperature heating.

Figure 13:
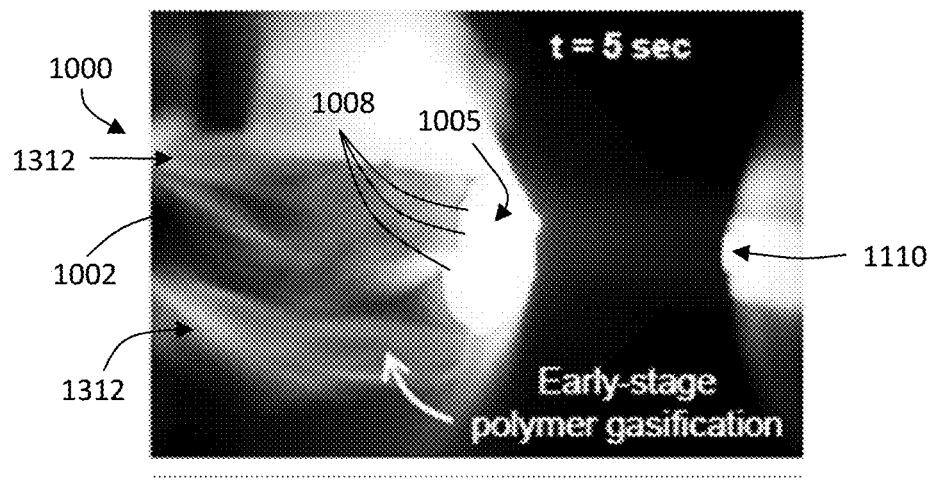
FIG. 13 is an image of the component of FIG. 10 after 5 seconds of heating during testing.
Figure 14:
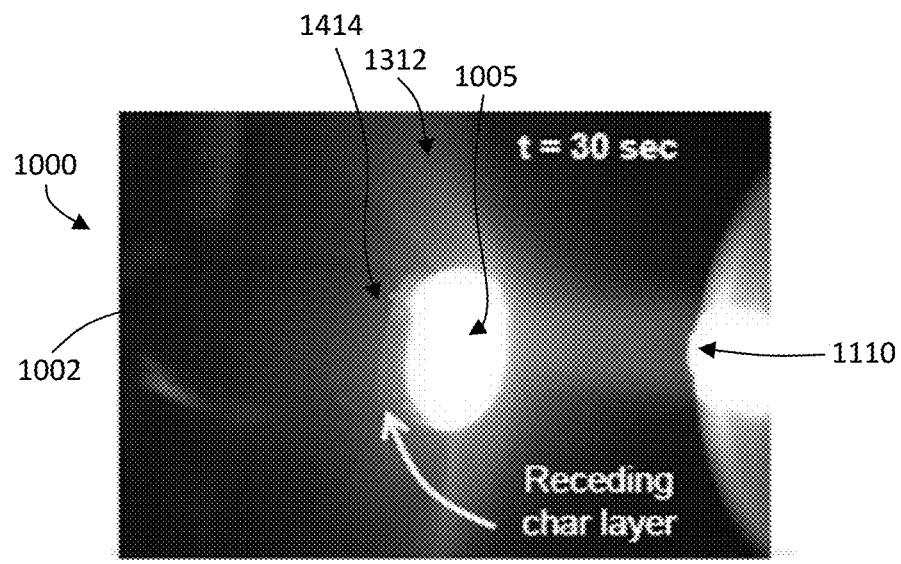
FIG. 14 is an image of the component of FIG. 10 after 30 seconds of heating during testing.

Referring to FIGS. 13 and 14, component 1000 including bulk structure 1002 and ablative material 1004, was subjected to high-temperature testing using the oxygen-propane torch 1110. The ablative material 1004 of component 1000 was polymer resin that was infiltrated into bulk structure 1002 and cured. FIGS. 13 and 14 illustrate an oxygen-propane torch 1110 directed toward second end wall 1005 of bulk structure 1002 after 5 seconds and 30 seconds, respectively. The images show pyrolysis of the ablative material 1004 beginning within the first 5 seconds of exposure of the second end wall 1005 to the oxygen-propane torch 1110 under the test conditions. In particular, FIG. 13 shows the early-stage gasification of the polymer ablative material 1004 with the resulting gas 1312 being exhausted from the pathways 1008 of the bulk structure 1002.

FIG. 14 illustrates the condition of component 1000 after it has been exposed to the oxygen-propane torch 1110 for 30 seconds. The image confirms that with additional exposure to the oxygen-propane torch, the ablative material 1004 continues to pyrolyze and forms a receding char layer 1414. The image also shows that even though the bulk structure 1002 adjacent the second end wall 1005 is heated, and the ablative material 1004 has receded, the shape of the bulk structure 1002 remains substantially unchanged after 30 seconds of high-temperature heating.

The component including the shape-stable bulk structure and ablative material can be configured for many different devices. In some embodiments, the component can be included in a vehicle that is exposed to a fluid flow. For example, the component can form a portion of an airfoil, a control surface, a fuselage, or any other portion of an aircraft subjected to atmospheric flight, such as high-speed atmospheric flight, that requires cooling.

The inventive concepts disclosed herein have been presented by way of example to illustrate the myriad features thereof in a plurality of illustrative scenarios, aspects, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various aspects have been described above, it should be understood that they have been presented by way of example only, and not limitation. Thus, the breadth and scope of an aspect of the present invention should not be limited by any of the above-described exemplary aspects, but should be defined only in accordance with the following claims and their equivalents.

III. Further Discussion of Some Example Embodiments (A1) A product comprises a bulk structure (e.g., FIG. 1, 102) and an ablative material (e.g., FIG. 1, 104). The bulk structure defines an outer surface (e.g., FIG. 1, 106) and a plurality of pathways (e.g., FIG. 2, 208) that intersect the outer surface. The bulk structure is constructed from at least one high temperature material that is shape-stable in a fluid flow and at an operating temperature of at least 2000° C. The ablative material is disposed within the pathways and the ablative material is configured to transition between a solid phase and a vapor phase over an operating temperature range.

(A2) In the product of A1, wherein the high temperature material is a high-temperature oxide.

(A3) In the product of A2, wherein the high temperature oxide includes a base element that is a transition metal or a rare earth element.

(A4) In the product of A1, wherein the high temperature material is a mixture of high-temperature oxides.

(A5) In the product of A1, wherein the high temperature material includes $HfO_2$, $ZrO_2$, $Ta_2O_5$, $Eu_2O_3$, $Yb_2O_3$, $Dy_2O_3$, $Ho_2O_3$, $Er_2O_3$, $Y_2O_3$, or combinations thereof.

(A6) In the product of A1, wherein the high temperature material includes $HfO_2$—$Ta_2O_5$, $HfO_2$—$Lu_2O_3$, or $ZrO_2$—$Y_2O_3$.

(A7) In the product of A1, A2 and A4-A6, wherein porosity of the bulk structure forms the pathways.

(A8) In the product of A1, A2 and A4-A7, wherein the ablative material is phenolic resin.

(B1) A product comprises a bulk structure (e.g., FIG. 1, 102) and an ablative material (e.g., FIG. 1, 104). The bulk structure defines an outer surface (e.g., FIG. 1, 106) and a plurality of pathways (e.g., FIG. 2, 208) that intersect the outer surface. The bulk structure is constructed from at least one high temperature oxide that includes a base element that is a transition metal or a rare earth element. The ablative material is disposed within the pathways and configured to transition between a solid phase and a vapor phase over an operating temperature range.

(B2) In the product of B1, wherein the at least one high temperature oxide is a mixture of high-temperature oxides.

(B3) In the product of B1, wherein the at least one high temperature oxide includes $HfO_2$, $ZrO_2$, $Ta_2O_5$, $Eu_2O_3$, $Yb_2O_3$, $Dy_2O_3$, $Ho_2O_3$, $Er_2O_3$, $Y_2O_3$, or combinations thereof.

(B4) In the product of B1, wherein the at least one high temperature oxide includes $HfO_2$—$Ta_2O_5$, $HfO_2$—$Lu_2O_3$, or $ZrO_2$—$Y_2O_3$.

(B5) In the product of B1-B4, wherein porosity of the bulk structure forms the pathways.

(B6) In the product of B1-B5, wherein the ablative material is phenolic resin.

(C1) A method of making a product comprises forming a bulk structure (e.g., FIG. 1, 102) defining an outer surface (e.g., FIG. 1, 106) and a plurality of pathways (e.g., FIG. 2, 208), infiltrating the bulk structure with an ablative material (e.g., FIG. 1, 104) so that the ablative material is disposed within the pathways, and curing the ablative material disposed in the pathways of the bulk structure. The pathways intersect the outer surface, and the bulk structure is constructed from at least one high temperature material that is shape-stable in a fluid flow and at an operating temperature of at least 2000° C.

(C2) In the method of C1, wherein the high temperature material is a high-temperature oxide.

(C3) In the method of C1-C2, wherein the high temperature oxide includes a base element that is a transition metal or a rare earth element.

(C4) In the method of C1, wherein the high temperature material is a mixture of high-temperature oxides.

(C5) In the method of C1-C4, wherein forming the bulk structure includes gel casting the bulk structure.

(C6) In the method of C1-C4, wherein forming the bulk structure includes an additive manufacturing process.

(C7) In the method of C1-C6, wherein forming the bulk structure includes mixing a plurality of high-temperature oxides.

What is claimed is:

1. A product, comprising:
    a bulk structure defining an outer surface and a plurality of pathways, wherein the pathways intersect the outer surface, and wherein the bulk structure is constructed from at least one high temperature material that:
    is shape-stable in a fluid flow and at an operating temperature of at least 2000° C., and
    includes a base element that is a transition metal or a rare earth element; and
    an ablative material disposed within the pathways, wherein the ablative material is configured to transition between a solid phase and a vapor phase over an operating temperature range.

2. The product of claim 1, wherein the high temperature material is a high-temperature oxide.

3. The product of claim 2, wherein the high temperature oxide includes the base element.

4. The product of claim 1, wherein the high temperature material is a mixture of high-temperature oxides.

5. The product of claim 1, wherein the high temperature material includes $HfO_2$, $ZrO_2$, $Ta_2O_5$, $Eu_2O_3$, $Yb_2O_3$, $Dy_2O_3$, $Ho_2O_3$, $Er_2O_3$, $Y_2O_3$, or combinations thereof.

6. The product of claim 1, wherein porosity of the bulk structure forms the pathways.

7. The product of claim 1, wherein the ablative material is phenolic resin.

8. A method of making the product of claim 1, the method comprising:
    forming a bulk structure defining an outer surface and a plurality of pathways, wherein the pathways intersect the outer surface, and wherein the bulk structure is constructed from at least one high temperature material that is shape-stable in a fluid flow and at an operating temperature of at least 2000° C.,
    infiltrating the bulk structure with an ablative material so that the ablative material is disposed within the pathways, and
    curing the ablative material disposed in the pathways of the bulk structure.

9. The method of claim 8, wherein the high temperature material is a high-temperature oxide.

10. The method of claim 9, wherein the high temperature oxide includes a base element that is a transition metal or a rare earth element.

11. The method of claim 8, wherein the high temperature material is a mixture of high-temperature oxides.

12. The method of claim 8, wherein forming the bulk structure includes gel casting the bulk structure and/or an additive manufacturing process.

13. A product, comprising:
a bulk structure defining an outer surface and a plurality of pathways, wherein the pathways intersect the outer surface, and wherein the bulk structure is constructed from at least one high temperature material that is shape-stable in a fluid flow and at an operating temperature of at least 2000° C.; and
an ablative material disposed within the pathways, wherein the ablative material is configured to transition between a solid phase and a vapor phase over an operating temperature range,
wherein the high temperature material includes a material selected from the group consisting of: $HfO_2$—$Ta_2O_5$, $HfO_2$—$Lu_2O_3$, and $ZrO_2$—$Y_2O_3$.

14. A product, comprising:
a bulk structure defining an outer surface and a plurality of pathways, wherein the pathways intersect the outer surface, and wherein the bulk structure is constructed from at least one high temperature oxide that includes a material selected from the group consisting of: $HfO_2$—$Ta_2O_5$, $HfO_2$—$Lu_2O_3$, and $ZrO_2$—$Y_2O_3$; and
an ablative material disposed within the pathways, wherein the ablative material is configured to transition between a solid phase and a vapor phase over an operating temperature range.

15. The product of claim 14, wherein the at least one high temperature oxide is a mixture of high-temperature oxides.

16. The product of claim 14, wherein the at least one high temperature oxide further includes $HfO_2$, $ZrO_2$, $Ta_2O_5$, $Eu_2O_3$, $Yb_2O_3$, $Dy_2O_3$, $Ho_2O_3$, $Er_2O_3$, $Y_2O_3$, or combinations thereof.

17. The product of claim 14, wherein porosity of the bulk structure forms the pathways.

18. The product of claim 14, wherein the ablative material is phenolic resin.

19. The product of claim 14, wherein the bulk structure is shape-stable in a fluid flow and at an operating temperature of at least 2000° C.

\* \* \* \* \*